Patented Sept. 28, 1954

2,690,439

UNITED STATES PATENT OFFICE 2,690,439

PRODUCTION OF SULFAMERAZINE

Harold R. Chipman, Elmira, Ontario, Canada, assignor to United States Rubber Company, New York, N. Y., a corporation of New Jersey No Drawing. Application July 10, 1953, Serial No. 367,369

3 Claims. (Cl. 260—239.75)

This invention relates to an improved method of manufacturing sulfamerazine, and, more particularly the invention is concerned with an improved method of making sulfamerazine from sulfaguanidine, without resort to certain inefficient intermediate steps.

One previously used method of manufacturing sulfamerazine from sulfaguanidine involved the preparation of an intermediate reagent, chlorovinyl methyl ketone. This intermediate was reacted with sulfaguanidine (i. e., sulfanilylguanidine) to form sulfamerazine (i. e., 2-sulfanilamido-4-methylpyrimidine), with the aid of a suitable reagent such as sodium ethylate, conveniently in an alcoholic medium. The resulting sodium salt of sulfamerazine was either marketed as such, or the sulfamerazine itself was recovered with the aid of a suitable acid, such as acetic acid.

The foregoing procedure had an objectionable feature, in that the chlorovinyl methyl ketone was highly unstable, and was therefore difficult to prepare in good yield, as well as difficult to store and utilize. Thus, the crude chlorovinyl methyl ketone as initially prepared was generally in the form of a dark brownish liquid, due to the presence of decomposition products and polymerization products. It was out of the question to use this crude as such for the preparation of sulfamerazine, because the colored impurities tended to carry through to the final product, even after purification, making the sulfamerazine unsuited for its intended use. Therefore, it was necessary to distill the chlorovinyl methyl ketone to obtain as nearly a water-white material as possible for reaction with the sulfaguanidine. This additional distillation not only represented an inconvenience and an expense, but the distilled product was quite unstable, and, after standing for a few hours, it tended to become dark and gradually decomposed. Ultimately, tarry polymers were formed. This effect was highly undesirable because the colored materials present tended to carry through to the final product, making it more difficult to purify the sulfamerazine to the desired essentially white medicinal grade. Also, the decomposition of the chlorovinyl methyl ketone upon standing represented a definite loss of material, with consequent proportionate reduction in yield. Since sulfamerazine is a relatively expensive chemical to manufacture, such loss of yield was particularly serious.

It is therefore a principal object of the present invention to provide a method of making sulfamerazine from sulfaguanidine that does not require the preparation of chlorovinyl methyl ketone as an intermediate.

The invention is based upon the discovery that dichlorobutanone-2 is a far more desirable intermediate reagent, and can be prepared conveniently and efficiently in a form that can be readily reacted directly with sulfaguanidine, to produce the desired sulfamerazine (or sodium salt thereof) in good yield, and in exceptionally white color and high purity.

In a preferred method of carrying out the invention, acetyl chloride is employed as the initial starting material, and, in the form of a complex with a Friedel-Crafts catalyst, preferably aluminum chloride, the acetyl chloride is converted into dichlorobutanone-2 by reaction with vinyl chloride, conveniently in the presence of a selected organic liquid carrier, such as carbon tetrachloride, as represented by the following equations:

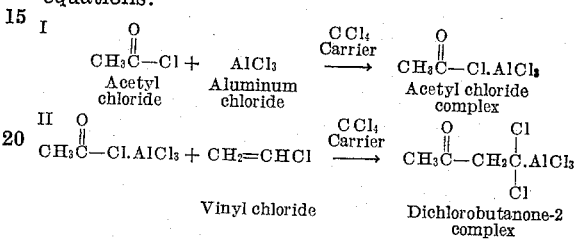

The dichlorobutanone-2 complex with aluminum chloride, or other Friedel-Crafts reagent, is insoluble in the carbon tetrachloride, and the complex is thus prepared in the form of a slurry in the liquid carrier. The complex is obtained in the form of a definitely crystalline material that is easily filterable.

The next step in the preferred process is to filter the foregoing slurry containing the dichlorobutanone-2 complex, thereby removing the inert organic liquid carrier, and providing the complex in the form of a good filter cake from which the last traces of the carrier may be removed by the application of suction. This filter cake is essentially white, indicating the absence of colored contaminants. In connection with this step of the improved process, it is important to note that no distillation step is necessary to remove the organic liquid carrier. This not only represents a convenience and a saving of time, and therefore an economy, but it also avoids exposing the intermediate at this stage to elevated distillation temperatures which could result in decomposition and formation of undesirable by-products, to the detriment of the yield and quality of the final product.

In the next step of the preferred process, the filter cake is removed from the filter and quenched with cold water. This quenching with water results in the decomposition of the dichlorobutanone-2 aluminum chloride complex, yielding the dichlorobutanone-2 itself according to the following equation:

III

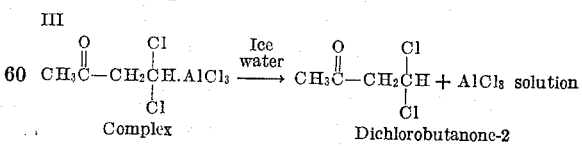

The free dichlorobutanone-2 separates out as a lower oily layer, while the aluminum chloride solution forms an upper aqueous layer. It is therefore possible to effect a simple gravity separation to obtain the dichlorobutanone-2. The separated oily layer may be washed further with ice water, and then dried with the aid of a dehydrating agent such as anhydrous sodium sulfate. However, for purposes of the invention, the separated oily layer may be used as is, without further treatment.

The dichlorobutanone-2 produced by this method is believed to be beta, beta-dichloroethyl methyl ketone and typically has a specific gravity of 1.265 at 20° C. It generally assays from 95% to 100% pure, as determined by analyzing for the labile chlorine atoms. This may be done by mixing the dichlorobutanone-2 with an excess of a standardized solution of sodium methylate in alcohol, and titrating the mixture with sulfuric acid.

The essential step of my improved process is based upon the surprising discovery that the dichlorobutanone-2 readily reacts with sulfaguanidine to form sulfamerazine of high purity in good yield. To prepare the sulfamerazine from this material, sulfaguanidine is suspended in an alcoholic solution of an alkali metal alcoholate and the dichlorobutanone-2 is added gradually thereto and reacted at moderately elevated temperatures (e. g. 40°–70° C.), probably by the reaction represented in the following equation:

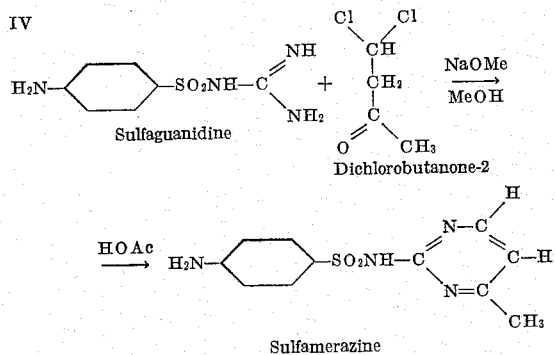

A spontaneous rise in temperature of the reaction mixture is generally noted, with simultaneous formation of a thick light yellow slurry of the precipitating sodium sulfamerazine. It is found that the final product obtained by using dichlorobutanone-2 as the intermediate reagent generally contains less colored material and responds more readily to purification, than when the comparatively unstable chlorovinyl methyl ketone is used as the intermediate reagent for reaction with sulfaguanidine. The sulfamerazine, or sodium salt thereof, obtained by this method is essentially white in color and usually melts at a temperature of from 232° to 234° C. The material meets the standards required by the United States Pharmacopoeia for medicinal grade sulfamerazine. The purified material is obtainable in good yield, generally 75% or better, based on the dichlorobutanone-2, or 90% based upon the sulfaguanidine consumed.

In the preferred process for the preparation of the intermediate dichlorobutanone-2, I employ an organic liquid carrier which is essentially inert toward the reactants, and which is a solvent for the acetyl chloride and the vinyl chloride, but essentially a non-solvent for the complex of aluminum chloride and the dichlorobutanone-2. The carrier liquid is preferably relatively volatile, boiling below about 80° C. (preferably from about 40° C. to 80° C.), in order to facilitate its removal from the filter cake by application of vacuum. Examples of suitable carrier liquids, in addition to carbon tetrachloride, are low boiling petroleum ethers, and carbon bisulfide.

Although aluminum chloride is the preferred material for forming the complex, it will be understood that the other well-known Friedel-Crafts catalysts may be used, including such acidic metallic halides as stannic chloride, stannous chloride and ferric chloride. Aluminum chloride reacts most efficiently.

I find it convenient to first add the aluminum chloride to the carbon tetrachloride or other inert solvent or carrier, and thereafter add the acetyl chloride to the mixture to form the complex with the aluminum chloride. Essentially equi-molar quantities of the aluminum chloride and the acetyl chloride are generally used. I generally prefer to use about eight times as much carbon tetrachloride as acetyl chloride on a weight basis, although I may also use other quantities, e. g., six to ten times as much carrier as acetyl chloride. When using appreciably less than six times as much solvent, the reaction slurry tends to become very thick. Greater amounts of the carrier may be used if desired, but with amounts appreciably larger than twelve times the weight of the acetyl chloride, there is the disadvantage that greater amounts of solvent must be accommodated in the reaction vessel, and greater quantities must be recovered, without added advantage. The best yields are usually obtained when the carrier amounts to about eight times the weight of the acetyl chloride.

The reaction between the acetyl chloride and the aluminum chloride is exothermic, and it is therefore preferred to add the acetyl chloride gradually, while cooling the mixture, to prevent the temperature from rising above about 20° or 25° C. Such low temperature addition minimizes the possibility of the acetyl chloride reacting with itself in the presence of the aluminum chloride. Preferably, I maintain the reaction mixture appreciably below 20° C. during the addition of the acetyl chloride, for example, in the neighborhood of 15° or 17° C. The mixture may of course, if desired, be maintained at a lower temperature, for example, down to 0° C. or even lower, but in practice I find that it is unnecessary to effect cooling to substantially below about 15° C. The time required to add the acetyl chloride will of course depend upon such factors as the degree of cooling and the size of the batch.

The vinyl chloride is conveniently added to the reaction mixture in the form of a gas, which is introduced at the lower portion of the reaction mixture through a suitable gas disperser that breaks up the vinyl chloride into small bubbles, to facilitate its dissolution and reaction. The addition of vinyl chloride is carried out gradually, for example, at a rate of from about 0.1 to 1.0 moles per hour, until a total of about one mole of vinyl chloride has been added for each mole of the acetyl chloride complex. I have found that gradual addition of the vinyl chloride favors the formation of thinner, more easily filterable slurries. For this reason, I much prefer to limit the rate of addition of the vinyl chloride to a comparatively slow rate, within the range of from 0.3 to 0.5 moles per hour and, by so doing, I am able to obtain immense practical advantages, arising from the fact that the particles of the precipitated dichloro-butanone-2 complex with aluminum chloride are larger and definitely crystalline. The reaction mixture therefore forms a thin slurry which is easy to stir, cool, and filter, and there is obtained a filter cake that is readily sucked dry and that is compact and can be easily and rapidly washed, with scarcely any appreciable hold-up of liquor and without objectionable packing. On the other hand, if the vinyl chloride is added rapidly, the dichlorobutanone-2 aluminum chloride complex comes down as extremely fine particles that form a very thick and inconvenient to handle slurry, that can be filtered only with great difficulty. The reaction is appreciably exothermic, and the mixture is preferably cooled sufficiently with ice water to maintain its initial low temperature. It is preferable to continue agitation of the reaction mixture for an hour or so after the addition of the vinyl chloride is complete, to insure substantially complete reaction of all of the vinyl chloride that has been added.

If desired, the vinyl chloride and the acetyl chloride may be added gradually concurrently, but, since the reactions of both of these reagents is exothermic, such a procedure requires an unusual degree of cooling, and therefore is generally less preferred.

I thereafter filter the mixture, preferably on a suction filter, although any other suitable filtration apparatus, such as a centrifuge, may of course be used. The carbon tetrachloride or other carrier liquid is preferably collected in a cooled receiver to prevent loss of the liquid into the vacuum system. The resulting white filter cake is washed at least once with a small volume of carbon tetrachloride, and the filter cake is finally pressed to remove as much of the solvent as possible. If desired, further carbon tetrachloride may be recovered from the cake by application of vacuum in a suitable vacuum drying apparatus, equipped with a cooled receiver. However, for purposes of the invention complete removal of the carbon tetrachloride from the filter cake is not essential, and no harm is done to the subsequent process by failure to remove all of the carbon tetrachloride. However, for the sake of economy, I generally recover as much of the carbon tetrachloride as possible.

To recover the desired dichlorobutanone-2 intermediate from the filter cake, I simply quench the cake in cold water, and for this purpose I generally use a mixture of ice and water because the decomposition is exothermic. The temperature prevailing in the quenching step is preferably maintained appreciably below (viz. preferably 20° C. or so below) reaction temperature prevailing during the reaction with vinyl chloride. The quenching temperature should be maintained below 10° C., and preferably at 0° C. or below to minimize decomposition of the dichlorobutanone-2. I preferably use acidulated water (containing, for example, concentrated hydrochloric acid in amount equal to about one-half the weight of the filter cake) for the quenching. Ordinarily, a lower oily layer representing the liberated dichlorobutanone-2 compound separates spontaneously from the aqueous layer containing the dissolved aluminum chloride. It sometimes happens that some water becomes emulsified with the dichlorobutanone-2, as evidenced by a cloudy appearance of the lower layer, and, if this occurs, it is simply necessary to subject the dichlorobutanone-2 to filtration with a filter aid, whereupon the filtrate takes the form of a lower clear layer of the dichlorobutanone-2 and a supernatant aqueous layer. Also, cooling tends to promote separation of the aqueous portion. After gravity separation of the dichlorobutanone-2, the product may be dried, or it may be used as is for preparation of the sulfamerazine. Drying may be accomplished by permitting the material to stand over anhydrous sodium sulfate, or the material may be cooled to about 5° C., whereupon any water present will rise to the top as a separate layer. I usually obtain by this method a yield of 75% or better of the dichlorobutanone-2, based on the acetyl chloride charged. Alternatively, I may remove the water from the dichlorobutanone-2 by azeotropic distillation, preferably with carbon tetrachloride. The carbon tetrachloride used for this purpose may first be used to extract the quench water, with a resulting appreciable increase in yield.

I assay the dichlorobutanone-2 by the method described previously, and from the resulting analysis, I am able to calculate the proper amount of sodium to be employed in the subsequent reaction.

I may use the dichlorobutanone-2 immediately in the preparation of sulfamerazine, or I may store the dichlorobutanone-2 indefinitely at temperatures of 0° C. or lower for use in preparing sulfamerazine at a later date, or I may transport the dichlorobutanone-2 (preferably containing a small amount of propylene oxide as a stabilizer) to some other locality for the manufacture of the sulfamerazine, without detriment to the yield or quality of the sulfamerazine finally obtained.

In preparing the sodium alcoholate medium in which the reaction between the dichlorobutanone-2 and the sulfaguanidine takes place, I may employ about three or four moles of sodium per mole of the dichlorobutanone-2. I have found that if the amount of sodium falls appreciably below about 3.5 moles per mole of the dichlorobutanone-2, an increased amount of very crude sufamerazine remains in the alcohol-soluble portion of the final reaction mixture, with a corresponding resulting drop in the final yield of pure sulfamerazine. On the other hand, if appreciably more than about 4 moles of sodium are employed, the final product tends to display an inferior melting point and assay. In place of sodium, other alkali metals may of course be used, such as potassium or lithium.

I usually prepare the sodium alcoholate by adding sodium metal to anhydrous methanol or ethanol at reflux temperatures, and continue stirring the mixture until all the sodium disappears. The amount of alcohol employed is generally within the range of from about 35 moles to about 60 moles, per mole of the dichlorobutanone-2, although I usually prefer to use from about 40 to 50 moles of the alcohol. Although the present process may be carried out using either ethanol or methanol in forming the necessary sodium alcoholate, it is much preferable to use methanol, since a number of unobvious and unexpected marked advantages can be realized through the use of methanol rather than ethanol, as is described in more detail and claimed in copending application Serial No. 299,218 of Chipman et al., filed July 16, 1952.

The sulfaguanidine is dried to remove the molecule of water of crystallization that it usually contains. The sodium alcoholate is cooled approximately to room temperature, whereupon the sulfaguanidine is added, and thereafter the dichlorobutanone-2 is added gradually to the resulting suspension, with agitation, in such manner as to permit a temperature rise from room temperature to about 50° C. A slight molar excess of the dichlorobutanone-2 is usually charged, per mole of the sulfaguanidine. A slight molar excess of the order of about 0.1 mole of the dichlorobutanone-2 favors an improved yield of sulfamerazine, with a minimum of unreacted sulfaguanidine to remove from the final product, but appreciably greater molar excesses do not result in a proportionate increase in yield. The rate of addition of the dichlorobutanone-2 is preferably so regulated that the temperature does not rise appreciably above 50° C. The total time required for such addition will of course vary with the size of the batch and the effectiveness of the cooling. After the addition of the dichlorobutanone-2 to the reaction mixture has been completed, stirring and heating of the mixture is preferably continued at a temperature of about 50° C., or at reflux temperature, for a period of several hours to bring the reaction substantially to completion. As stated previously, there is generally observed a spontaneous rise in temperature, from a value of 50° C. to a value of about 57° C., shortly after the addition of the dichlorobutanone-2 has been completed, indicating that an exothermic reaction has taken place.

Upon completion of the reaction, the mixture is cooled to room temperature to precipitate completely the material which is insoluble in the alcoholic medium. The alcohol-insoluble material is comprised of the sodium salt of sulfamerazine along with sodium chloride as a by-product. The mixture is then filtered, and it is found that the solid material is of easily filterable crystalline structure and forms a good, firm filter cake, which is not highly colored. The filtrate apparently contains practically all of the colored impurities and by-products of the reaction. The filter cake is thereafter washed with a small amount of alcohol and is then dissolved in water. If the reaction has been carried out in a medium comprising methanol, the cake is completely soluble in water at room temperature, indicating that it contains no appreciable unreacted sulfaguanidine, and is comprised of the sodium salt of sulfamerazine in practically a pure state. The resulting aqueous solution can be further decolorized by adding a small amount of activated charcoal, together with 1% or so of sodium hydrosulfite, and heating on a steam bath at a temperature of 80°–90° C. for a period of about one-half hour. The solution may then be filtered and cooled to room temperature, after which it may be acidified to precipitate the sulfamerazine. The sulfamerazine obtained in this way is white and practically pure.

Any unreacted sulfaguanidine may be recovered from the alcoholic filtrate by distilling off the alcohol and dissolving the residue in hot water, from which the sulfaguanidine may be crystallized by cooling, and filtered off and dried for re-use. Sometimes, small amounts of crude sulfamerazine may be recovered from the alcoholic filtrate by acidifying it and filtering. However, if the sodium content of the reaction mixture is maintained within the preferred limits specified above, the amount of crude sulfamerazine in the alcoholic filtrate will be negligible.

The following examples will serve to illustrate the invention in more detail.

EXAMPLE 1

*Preparation of dichlorobutanone-2*

This preparation was carried out in a glass vessel equipped with a reflux condenser, an agitator, and a cooling jacket. Twelve hundred parts by weight of technical carbon tetrachloride was placed in the vessel, and 266 parts of powdered aluminum chloride was added. The agitator was started and the contents of the vessel were cooled to 15° C. 159 parts of technical acetyl chloride was added gradually to the mixture over a period of 40 minutes, while maintaining the temperature within the range of from 15° to 17° C.

At the completion of the acetyl chloride addition, gaseous vinyl chloride was bubbled into the mixture through a gas disperser at the rate of from about 50 to 60 parts per hour, at a temperature of from 16° to 18° C. for a period of about three hours. This resulted in a gain in weight of the reaction mixture of about 128 parts. The reaction mixture was stirred for an additional hour, after which the aluminum chloride complex of the dichlorobutanone-2 was filtered off on a suction filter, the carbon tetrachloride being collected in a receiver cooled in an ice-salt mixture. The white filter cake was washed with 200 parts of carbon tetrachloride and pressed to remove as much of the solvent as possible.

The filter cake as removed from the filter amounted to about 600 parts and, after subjecting the cake to vacuum in a dessicator for one hour the cake amounted to about 550 parts. A total of about 1200 parts of carbon tetrachloride was recovered.

The filter cake was then quenched in a mixture of 1200 parts of ice and 300 parts of water, whereupon the dichlorobutanone-2 appeared as a lower oily layer, which was separated and dried over sodium sulfate. The dichlorobutanone-2 had a specific gravity of 1.265 at 25° C. and amounted to about 225 parts, which represents a yield of about 76% based on the acetyl chloride. The material analyzed 95.5% pure.

EXAMPLE 2

*Utilization of the dichlorobutanone-2 in preparation of sulfamerazine*

Twenty-eight parts of sodium was added to 600 parts of anhydrous methanol in a glass reaction vessel provided with a reflux condenser and an agitator, as well as a heating and cooling jacket. During the addition of the sodium the temperature was maintained at about 50 to 64° C. by slight cooling. The reaction mixture was then cooled to 20° C., and 64.2 parts of sulfaguanidine (previously dried at 110° C. for at least 4 hours) was added.

Forty-six point five parts of the dichlorobutanone-2 prepared in Example 1 was added dropwise to the mixture over a period of from about 10 to 15 minutes, while cooling the reaction mixture sufficiently to prevent the temperature from exceeding 50° C. For the most part the temperature of the reaction mixture was between 40° and 45° C. Upon completion of the addition of the dichlorobutanone-2 the mixture was maintained at a temperature of about 50° C., with continued stirring. About 15 minutes after the addition of the dichlorobutanone-2 was completed, there was observed a sudden rise in temperature to about 57° C., with simultaneous formation of a thick light yellow slurry of the precipitating sodium sulfamerazine. The heating of the reaction mixture at a temperature of 50°–57° C. was continued for a total time of about two hours, after which the mixture was heated for an additional four hours at about 64°–67° C., which is the approximate refluxing temperature of the methanol, to make certain that the reaction had proceeded substantially to completion.

The reaction mixture was then cooled to 20° C., and filtered on a suction filter. The wet cake amounted to about 168 parts, and the methanol filtrate amounted to about 595 parts. The cake was washed with 200 parts of methanol.

The sodium sulfamerazine weighed about 106 parts after drying. The sodium sulfamerazine was then dissolved in 500 parts of water, and the solution was partially neutralized to a pH of 9.5 by the addition of sulfuric acid, after which the pH was adjusted to 10.5 by the addition of the 3 parts of calcium hydroxide. The mixture was heated to boiling, and 0.6 part of sodium hydrosulfite was added, and the heating was continued for about 15 minutes. The solution was then cooled to a temperature of 90° C., and 3 parts of activated decolorizing charcoal was added. Heating was continued in the presence of the charcoal for about one-half hour, after which the solution was filtered hot, and the filtrate was cooled to room temperature.

The sulfamerazine was precipitated by the addition of 30% acetic acid, and the pure white sulfamerazine was separated by filtration. Sixty-five parts of dried sulfamerazine was obtained, which passed the United States Pharmocopoeia tests on color and melting point. The yield of the product based on pure dichlorobutanone-2 charged was 70%. The yield based on the sulfaguanidine consumed was 90%.

The alcoholic filtrate was distilled under a reduced pressure of 140 mm. using a pot temperature not exceeding 40° C. The recovered methanol amounted to about 575 parts. The residue from the methanol distillation was dissolved in 600 parts of water at 75°–80° C., and the unreacted sulfaguanidine was crystallized from this solution by cooling it to 20° C. The recovered sulfaguanidine was separated by filtration of the resulting slurry, and dried in an oven at 110° C. The recovered sulfaguanidine amounted to 6.5 parts.

The filtrate from the sulfaguanidine recovery sometimes contains the sodium salt of very crude sulfamerazine which can be separated by acidification and filtration. This amounts to from about 0.5 to 1.2 parts of brown-colored material.

If it is desired to recover the sulfamerazine in the form of its sodium salt, the initial precipitate obtained by cooling the reaction mixture as described in this example may be taken up in about half the quantity of water uesd in this example, and, after treatment with sodium hydrosulfite and decolorizing charcoal at elevated temperature as described, the sodium salt may be obtained simply by cooling the concentrated aqueous solution, whereupon the sodium salt will precipitate.

EXAMPLE 3

Preparation of dichlorobutanone-2

This preparation was carried out in a glass vessel equipped with a condenser, a cooling bath and an agitator. 1200 parts by weight of technical carbon tetrachloride was placed in the vessel and 266 parts of powdered aluminum chloride was added. The agitator was started and the contents of the vessel cooled to 15° C. 159 parts of technical acetyl chloride was added gradually to the mixture over a period of 40 minutes, while maintaining the temperature within the range of from 15–17° C.

At the completion of the acetyl chloride addition, gaseous vinyl chloride was bubbled into the mixture through a gas disperser at the rate of 50 to 60 parts per hour at a temperature of 16–18° C. for a period of about 3 hours. This resulted in a gain in weight of the reaction mixture of about 133 parts. The reaction mixture was stirred for an additional hour, after which the aluminum chloride complex of dichlorobutanone-2 was filtered off on a suction filter, the carbon tetrachloride being collected in a receiver cooled in an ice-salt mixture. The white filter cake was washed with 200 parts of carbon tetrachloride and pressed to remove as much of the solvent as possible.

The filter cake as removed from the filter amounted to 584 parts. The dry weight was 555 parts. A total of 1389 parts of carbon tetrachloride was recovered.

The filter cake was quenched in a mixture of 1200 parts of ice and 300 parts of water, whereupon the dichlorobutanone-2 appeared as an oily layer which was separated. The water layer was extracted twice with 200 parts of CCl4 and 125 parts in a third extraction. The wet dichlorobutanone-2 was added to a distillation flask provided with a condenser and a cooled receiver. The system was evacuated to a reduced pressure of 100 mm. and the contents of the flask heated to 25–28° C. while adding the wash carbon tetrachloride dropwise to the flask. The carbon tetrachloride was thus flashed off to the receiver, carrying with it any water contained in the product. 280 parts of material analyzing 82% dichlorobutanone-2 and 18% carbon tetrachloride was obtained.

The yield of dichlorobutanone-2 based on the acetyl chloride is 81.4%.

EXAMPLE 4

Effect of mole ratio of sodium on yield of sulfamerazine

The dichlorobutanone-2 prepared in Example 3 was used in a series of three sulfamerazine preparations, following essentially the procedure of Example 2, but varying the mole ratio of sodium from one run to the next. The results are summarized in the table.

| Run # | Parts of Sulfaguanidine | Parts of Dichlorobutanone-2 | Parts of MeOH | Parts of Sodium | Parts of Sulfaguanidine Recovered | Parts of Sulfamerazine Recovered | Yield Based on Sulfaguanidine | Yield Based on Dichlorobutanone-2 | Melting Range, °C. | Assay, Percent |
|---|---|---|---|---|---|---|---|---|---|---|
| 1 | 64.2 (0.30 mole) | 55.5 (0.33 mole) | 480 (3.50 mole/mole DCB) | 27 | 5.5 | 64.9 | Percent 89.2 | Percent 75.7 | 233.5–235.0 | 100.9 |
| 2 | 64.2 (0.30 mole) | 55.5 (0.33 mole) | 480 (3.78 mole/mole DCB) | 29 | 5.8 | 66.2 | 91.9 | 76.0 | 232.0–233.5 | 99.2 |
| 3 | 64.2 (0.30 mole) | 55.5 (0.33 mole) | 480 (4.02 mole/mole DCB) | 31 | 5.2 | 67.4 | 92.3 | 77.4 | 227.0–231.0 | 99.4 |

The data in the table indicate that run #3, using 4.02 moles of sodium, gave the highest yield, but, run #2, employing somewhat less sodium, gave the best overall results, taking into consideration not only yield, but melting range and assay.

From the foregoing, it will be apparent that the invention makes possible a remarkable simplification in the manufacture of sulfamerazine. The preparation of the chlorovinyl methyl ketone, with its attendant time-consuming and inconvenient low temperature vacuum distillation, as well as its attendant losses in yield and impairment of quality, due to decomposition, is eliminated by my improved method. Instead, the starting materials, acetyl chloride and vinyl chloride, are formed into a different intermediate reagent, dichlorobutanone-2, which does not require any vacuum distillation but rather, by proper selection of the carrier liquid in which the reaction is carried out, can be separated easily and quickly, in the form of its aluminum chloride complex, by a simple filtration. Subsequent recovery of the dichlorobutanone-2 in a state of high purity from the quenched complex can be accomplished by a simple gravity separation. Since the dichlorobutanone-2 does not tend to form colored materials or tars during the preparatory steps and processing conditions employed in this method, high yields and good quality in the final product are favored.

Having thus described my invention, what I claim and desire to protect by Letters Patent is:

1. A method of manufacturing sulfamerazine comprising in combination the steps of adding 4,4'-dichlorobutanone-2 to a suspension of sulfaguanidine in alcoholic alkali metal alcoholate, and heating the said mixture at a temperature of from 40° C. to about 70° C., whereby the alkali metal salt of sulfamerazine is formed.

2. A method of manufacturing sulfamerazine comprising in combination the steps of adding 4,4'-dichlorobutanone-2 to suspension of sulfaguanidine in alcoholic sodium alcoholate, and heating the said mixture at a temperature ranging from about 50° C. to reflux temperature, whereby the sodium salt of sulfamerazine is formed.

3. A method of manufacturing sulfamerazine comprising in combination the steps of adding 4,4'-dichlorobutanone-2 to suspension of sulfaguanidine in alcoholic sodium alcoholate at such a rate that the temperature of the mixture does not rise above 50° C., and heating the said mixture at a temperature ranging from about 50° C. to reflux temperature, whereby the sodium salt of sulfamerazine is formed.

References Cited in the file of this patent

FOREIGN PATENTS

| Number | Country | Date |
| --- | --- | --- |
| 282,412 | Great Britain | Dec. 15, 1926 |
| 463,229 | Canada | Feb. 14, 1950 |